United States Patent [19]
Tucker

[11] Patent Number: 5,472,256
[45] Date of Patent: Dec. 5, 1995

[54] LATCHING CROSSBAR APPARATUS FOR TRUCK BED COVERS

[75] Inventor: David Tucker, Palatine, Ill.

[73] Assignee: Design Automotive Group, Inc., Addison, Ill.

[21] Appl. No.: 294,944

[22] Filed: Aug. 24, 1994

[51] Int. Cl.$^6$ ................................................ B60P 7/02
[52] U.S. Cl. ........................ 296/100; 296/104; 296/118
[58] Field of Search ................................. 296/100, 102, 296/104, 105, 118, 119

[56] References Cited

U.S. PATENT DOCUMENTS

| | | | |
|---|---|---|---|
| 2,368,405 | 1/1945 | Black | 296/118 |
| 3,066,974 | 12/1962 | Ambli | 296/100 |
| 4,248,475 | 2/1981 | Johnsen | 296/100 |
| 4,273,377 | 6/1981 | Alexander | 296/100 |
| 4,479,677 | 10/1984 | Gullette et al. | 296/98 |
| 4,496,184 | 1/1985 | Byrd et al. | 296/100 |
| 4,607,876 | 8/1986 | Reed | 296/100 |
| 4,639,033 | 1/1987 | Wheatley et al. | 296/100 |
| 4,838,602 | 6/1989 | Nett | 296/100 |
| 4,848,824 | 7/1989 | Smith et al. | 296/100 |
| 4,902,065 | 2/1990 | Thralls | 296/104 |
| 4,923,240 | 5/1990 | Swanson | 296/100 |
| 5,058,652 | 10/1991 | Wheatley et al. | 160/327 |
| 5,121,960 | 6/1992 | Wheatley | 296/100 |
| 5,139,375 | 8/1992 | Franchuk | 296/104 X |
| 5,263,761 | 11/1993 | Hathaway et al. | 296/100 |
| 5,353,826 | 10/1994 | Davis, Sr. | 296/100 X |

OTHER PUBLICATIONS

*Sport Masters Brochure*, undated but believed to date as early as Feb. 19, 1990.
*Innovative Accessories Brochure*, undated but corresponds to subject matter of U.S. Pat. No. 4,838,602 listed above.

*Primary Examiner*—Dean Kramer
*Attorney, Agent, or Firm*—Dick and Harris

[57] ABSTRACT

A latching crossbar apparatus for supporting a flexible cover for a truckbed cover of the type employing rails which are affixed proximate or on the tops of the side walls of a pickup truck cargo box. The crossbar apparatus includes a latching mechanism for the facilitated installation and subsequent removal of the crossbars from the rails.

10 Claims, 1 Drawing Sheet

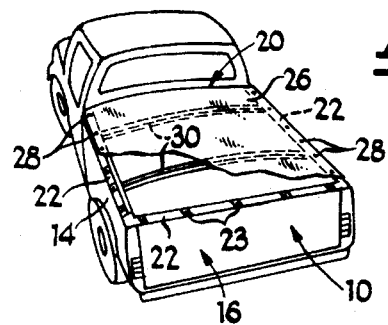
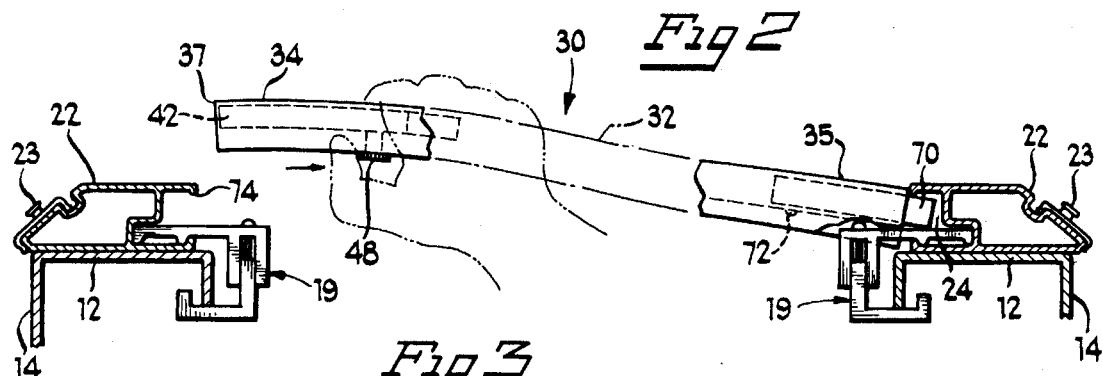
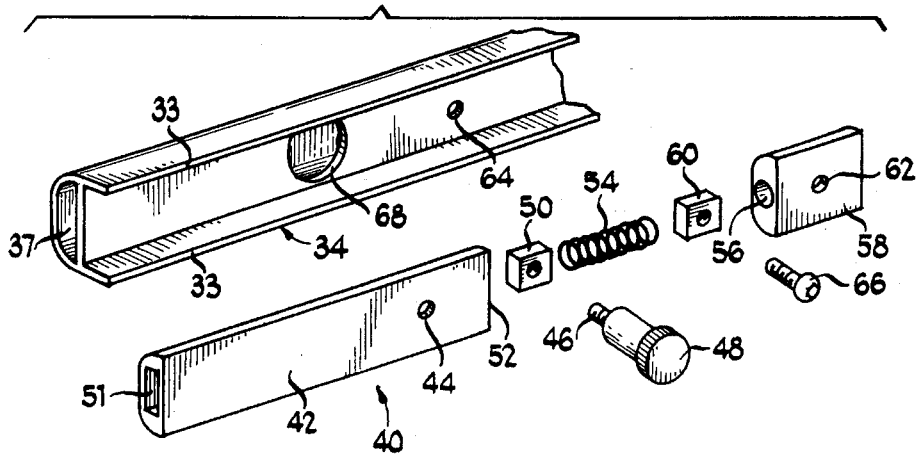
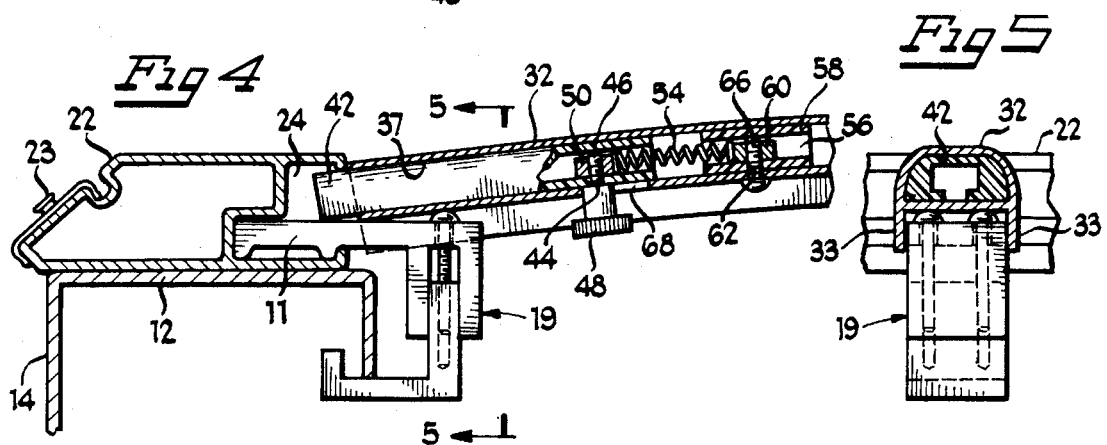

LATCHING CROSSBAR APPARATUS FOR TRUCK BED COVERS

BACKGROUND Of THE INVENTION

The present invention is directed to covers for the beds of pickup type trucks, open bed trailers, and recreational vehicles, such as small boats. In particular, the present invention is directed to cover systems employing a flexible cover, which may be fabricated from leather, fabric or vinyl, and attached to a plurality of rails which may be attached, in the example of a pickup truck, to the tops of the side walls of the cargo box of the pickup truck.

In order to support the cover, crossbars are employed which extend from one side of the truckbed to the other, and maintain the cover in an upwardly convex configuration, to facilitate runoff of rainwater, melted snow, dust and debris, so as to maintain an attractive appearance, and prevent accelerated degradation of the cover material. The first such crossbars to be used were simple flat, hollow, arcuate tubes which are substantially wedged by force into place, either onto stubs projecting from the clamps holding the rails in place, or into the rails themselves. Such simple crossbars tend to force the sidewalls of the truckbed outwardly, are difficult to install and remove, are inherently unstable in that they can twist or reverse themselves, and must have a relatively high arch in order to maintain the desired convex configuration.

Another example of crossbar construction may be found in the pickup truck bed cover system of Tucker, U.S. Pat. No. 5,152,574. In the Tucker '574 patent is disclosed a cover system in which a plurality of rails are clamped to the tops of the sidewalls of the cargo box of a pickup truck. The cover, such as previously described, may be attached to the rails by a plurality of male snap members which are clipped onto the outwardly facing surfaces of the rails. The cover has a plurality of female snap members affixed to the perimeter of the cover. Attachment of the crossbar members is accomplished by the bolting of the ends of the crossbar members to the tops of the clamping members which affix the rails to the sides of the truck.

While such a method of attachment may provide a relatively solid and secure attachment of the crossbar member to the rails of the cover system, if it is desired to place an object in the cargo box which is too large to be covered, and requires the removal of the crossbar members, it can be time-consuming, difficult or impossible to remove the crossbar members, especially if they are attached with bolts which may require a specialized or not readily available tool, such as an Allen wrench.

Other cover systems employ crossbar members which may have open forked ends, which fit around the threaded shafts of thumb-screw members which may be threaded into the clamping members or into the rails. An example of such a construction may be found in the TEKSTYLE TM brand cover system sold by Design Automotive Trim and Accessories, Inc. However, such other screw members, while possibly easier to manipulate than bolts requiring specialized tools, are still time-consuming to operate, and can loosen over time due to the vibrations of the moving vehicle which cause the crossbars to vibrate in turn, not only loosening the screws but also causing wear on the surfaces to which the ends of the crossbars are attached. In addition, the threads on the thumbscrews have a limited number of cycles of attachment and removal, before replacement is required.

Still another prior art cover system employs crossbar members which are provided with extension members which enable the cover system to accommodate truck beds having varying or non-standard widths. In Barben et al., U.S. Pat. No. 5,275,458, a cover system is disclosed, in which the crossbar members are substantially hollow tubes, of rectangular cross-section. Insert members 92 are provided which are insertingly received in crossbar members 28. Insert members 92 are hollow underneath so as to align with and receive tabular tangs 78, which project upwardly from the brackets 54 of clamps 24. Each of insert members 92 also includes a small tab, which aligns with and fits atop second leg 66, and both are received within and between the opposed edges defining the inwardly facing open slot of the rail member.

The Barben et al. '458 cover system, however, relies upon mere friction, of the tab and the second leg 66 within the slot, of the tangs 78, within the interior cavity of the insert members 92, and of the insert 92 within the opening of crossbar 28, in order to maintain crossbar members 28 in position. Such a method of attachment may be alternately too loose, and result in eventual displacement of the crossbars, or be too tight, and result in increased difficulty in removal of the crossbars, should that be desired.

It would be desirable to provide a flexible cover system for pickup truck cargo boxes and the like, which is provided with crossbar members which are readily attachable to and removable from the rails to which the flexible cover member is attached.

These and other objects of the invention will become apparent in light of the present specification, claims and drawings.

SUMMARY OF THE INVENTION

The present invention is an apparatus for supporting a cover for an open-topped vehicle enclosure having a plurality of side walls, each side wall including at least an outer wall and a top wall, the cover being of the type which is affixable to a plurality of rail members being mounted proximate or on top of the top walls of the side walls of the enclosure, the plurality of rails being affixed proximate the top walls of the side walls of the enclosure by a plurality of clamping members.

The apparatus for supporting a cover comprises at least one elongated bow member, operably configured so as to substantially extend from one of the plurality of rail members. Retraction means are operably associated with the at least one elongated rail member, for selectively releasably attaching and detaching the at least one elongated bow member to the respective one of the plurality of rail members.

In a preferred embodiment of the invention, the at least one bow member substantially extends from one of the plurality of rail members to another of the plurality of rail members.

In an embodiment of the invention, in which each rail member has an inwardly opening slot disposed along at least a portion of the length of each rail member, the retraction means for selectively releasably attaching the at least one elongated bow member comprises at least one retractable engagement member, operably disposed at an end of the at least one elongated bow member, for reciprocable movement relative to the bow member, and operably configured to be insertingly received within the inwardly opening slot of one of the rail members.

In a preferred embodiment of the invention, the retraction means for selectively releasably attaching the at least one bow member further comprises means for biasing the at least one retractable engagement member into an outwardly extended position, relative to the at least one bow member, such that when the at least one retractable engagement member is in the outwardly extended position, the at least one retractable engagement member may be insertingly received within the inwardly opening slot. In an embodiment in which the one end of the at least one elongated bow member is substantially hollow, the at least one retractable engagement member is insertingly, reciprocably received within the substantially hollow one end of the at least one elongated bow member, and the means for biasing the at least one retractable engagement member into an outwardly extended position further comprises a spring member, operably disposed in the substantially hollow end of the at least one elongated bow member, between the at least one retractable engagement member and a recessed end wall of the at least one elongated bow member.

The invention further comprises means for enabling selective inward retraction of the at least one retractable engagement member. In a preferred embodiment of the invention, the means for enabling selective inward retraction of the at least one retractable engagement member comprises a retraction member, operably affixed to, and emanating laterally from the at least one retractable engagement member, and extending through a slot in the substantially hollow end of the at least one elongated bow member, such that by exertion of force by a user on the retraction member, the at least one retractable engagement member may be forced to move, against the force of the biasing means, toward a retracted position in the substantially hollow end of the at least one elongated bow member.

Preferably, the at least one retractable member is fabricated from a non-metallic, non-scratching material, such as a resilient plastic material.

In an alternative preferred embodiment of the invention, the retraction means for selectively releasably attaching the at least one elongated bow member comprises two retractable engagement members, operably disposed at opposite ends of the at least one elongated bow member, for reciprocable movement relative to the bow member, and operably configured to be insertingly received within the inwardly opening slot in each of the rail members.

BRIEF DESCRIPTION OF THE DRAWINGS

FIG. 1 is a perspective view of a pickup truck having a cover system according to the present invention illustrated thereon, is partial cutaway view;

FIG. 2 is a side elevation, showing the installation procedure of the crossbar according to the present invention;

FIG. 3 is an exploded view of the latching mechanism of a crossbar according to the present invention;

FIG. 4 is a side elevation, in partial section, of the apparatus according to the present invention;

FIG. 5 is a view, in section, along lines 5—5 of FIG. 4.

DETAILED DESCRIPTION OF THE DRAWINGS

While the present invention is susceptible of embodiment in many different forms, there is shown in the drawings and will be described herein in detail, a specific embodiment, with the understanding that the present disclosure is to be considered as an exemplification of the principles of the invention, and is not intended to limit the invention to the embodiment illustrated.

FIG. 1 shows a pickup truck 10 having a cover system 20 in place, employing a plurality of rails 22. A flexible cover 26 which may be fabricated from leather, fabric or vinyl or the like, is attached to rails 22 by a plurality of male snap members 23 clipped onto rails 22, which mate with female snap members 28, which are affixed into the periphery of cover 26.

A rail 22 is shown in sectional view in FIG. 2. In the preferred embodiment of the invention, rail 22 is held onto and against the top wall 12 of side wall 14 of truckbed 16 of truck 10 by a plurality of clamping members 19. Rail 22 could also be affixed adjacent to the top wall 12 of side wall 14 of truckbed 16, in an alternative embodiment of the invention. Each rail 22 has an inwardly facing slot 24, a portion of which receives an upper arm 11 of clamping member 19.

In order to support cover 26, so as to facilitate the runoff of rain or melted snow, and prevent the accumulation of dirt, leaves, and the like, one or more crossbars 30 are provided. Each crossbar 30, as shown in further detail in FIGS. 2–5, preferably comprises a metallic tube 32, for example of extruded or stamped and rolled aluminum. The length of tube 32 should be just slightly less than the inside-to-inside distance between rails 22. Tube 32 is formed with two substantially hollow ends 34 and 35, each of which has an opening 37 and 38, respectively, which has, in a preferred embodiment of the invention, a semicircular cross-section, although another cross-sectional shape, such as a triangle or rectangle, may also be employed.

Each crossbar 30 also has a pair of opposed, substantially parallel flanges 33, which extend downwardly, substantially along the length of the crossbar 30, or alternatively, at least in the vicinity of the hollow ends 34 and 35. As described in further detail hereinafter, flanges 33 help keep crossbar 30 aligned with and above clamping members 19.

Latch mechanism 40 is shown in section in FIG. 4 (although a portion of the structure has been omitted for clarity), and in exploded view in FIG. 3. Engagement member 42 has a cross-sectional configuration which preferably substantial corresponds to the interior of hollow end 34, for relatively loose sliding fit therein. Engagement member 42 includes an aperture 44, through which pin 46 of knob 48 is received. Pin 46 may have a threaded end. Knob 48 may be held in place, for example, by nut 50, which, to facilitate assembly, may fit into a suitable slot 51 in engagement member 42. Engagement member 42 is preferably formed from a relatively rigid plastic material, which is strong enough to withstand the usual loading to be put upon such a crossbar member, but is not hard enough to scratch or deface the material of rails 22.

In an interior end 52 of engagement member 42 is an appropriate recess or stud (not shown) which assists in the alignment of spring 54. The other end of spring 54 is received in recess 56 in stop member 58.

The assembly of latch mechanism 40 into hollow end 34 of crossbar as follows. Stop member 58, with nut 60 positioned in a suitable recess as described relative to engagement member 42, is inserted into aperture 37, such that aperture 62 of stop member 58 aligns with aperture 64 of hollow end 34 of crossbar 30. Bolt 66 is then inserted and tightened down to secure stop member 58 within aperture 37. In a preferred embodiment of the invention, stop member 58, spring 54 and engagement member 42 and nut 50 are all inserted as a unit, although other methods of assembly to provide such latch mechanism assemblies are contemplated as being within the scope of this invention. Once the stop member and engagement member 42 are inserted, engagement member 42 will extend axially outwardly somewhat from the entrance to aperture 37. Pressure on the end of engagement member 42 will cause it to be pushed into aperture 37, such that aperture 44 will become visible through enlarged opening 68 in hollow end 34 of crossbar 30. Pin 46 will be inserted into aperture 44, and knob 48 tightened down. The relative lengths of aperture 37 and of engagement member 42, and stop member 58, and the spacing therebetween is such that when pressure is exerted upon knob 48 toward aperture 64, the extreme exposed end of engagement member 42 will recede to become flush with the opening of aperture 37, or recede into aperture 37, as may be desired. This movement is indicated in FIG. 2, in which the phantom lines indicate the retracted position of engagement member 42, and the corresponding position of knob 48, respectively. The interference between the edge of aperture 68 and knob 48, prevents engagement member 42 from being ejected from, or simply falling out of aperture 37.

The opposite end 35 of crossbar 30 may have a similar latching mechanism (not shown), or to save cost, a simple solid, non-moving engagement member 70 may be bolted in position, such as by bolt 72. Engagement member 70 also is fabricated from a plastic material as previously described.

Installation of the crossbar 30 is illustrated in FIG. 2. Non-moving engagement member 70 is inserted into slot 24 of right-hand rail 22, as illustrated. Engagement member 42 is retracted by pressure upon knob 48, so that end 34 of crossbar 30 "clears" the upper inner edge 74 of left-hand rail 22. Once the opening of aperture 37 is substantially aligned with slot 24 of right-hand rail 22, pressure on knob 48 is released, and, under the bias of spring 54, engagement member 42 will extend into slot 24, locking crossbar 30 in place.

In a preferred embodiment of the invention, crossbar 30 is also configured to have a width which is slightly greater than the width of the clamping members 19, such that, when ends 35 and 34 are aligned with slots 24 of rails 22, flanges 33 will surround the sides of clamping members 19 (which, presumably, are installed on substantially opposite sides of rails 22). By engaging crossbars 30 with clamping members 19, the ends of crossbars 30 are precluded from axially shifting and falling out of slots 24, and the overall strength and rigidity of cover system 20 is enhanced, while still maintaining a simplified structure and method of installation.

Removal of crossbar 30 is simply the reverse of the installation process previously described, and, of course, the orientation of crossbar 30 may be reversed, such that non-moving engagement member 70 is on the left-hand side, and the engagement member 42 is on the right-hand side, as viewed from the perspective of FIG. 5.

An alternative method of aligning and securing the ends of crossbar 30, if engagement with clamping members 19 is not desired, would be to provide pockets or dividers in slots 24 (not shown) which would restrain the ends of engagement members 42 and 70 from movement in either direction along rails 22. The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. An apparatus for supporting a cover for an open-topped vehicle enclosure having a plurality of side walls, each side wall including at least an outer wall and a top wall, the cover being of the type which is affixable to a plurality of rail members being mounted proximate the top walls of the side walls of the enclosure, the plurality of rails being affixed proximate the top walls of the side walls of the enclosure, the apparatus for supporting a cover comprising:

at least one elongated crossbar member for supporting a portion of said cover, operably configured so as to substantially extend between two of the rail members and, biased retraction means, operably associated with the at least one elongated crossbar member, for selectively releasably attaching and detaching the at least one elongated crossbar member from the respective ones of the two rail members, so as to enable the at least one elongated crossbar member to be readily removed from its position between the two rail members;

said retraction means including means for substantially securing and precluding inadvertent movement of said at least one crossbar member after attachment to the respective ones of the two rail members with or without said cover.

2. The apparatus for supporting a cover for an open-topped vehicle enclosure according to claim 1, wherein said at least one crossbar member substantially extends from one of the plurality of rail members to another of the plurality of rail members.

3. The apparatus for supporting a cover for an open-topped vehicle enclosure according to claim 1, wherein each rail member has an inwardly opening slot disposed along at least a portion of the length of each rail member and the retraction means for selectively releasably attaching the at least one elongated crossbar member comprises:

at least one retractable engagement member, operably disposed at an end of the at least one elongated crossbar member, for reciprocable movement relative to the crossbar member, and operably configured to be insertingly received within the inwardly opening slot of one of the rail members.

4. The apparatus for supporting a cover for an open-topped vehicle enclosure according to claim 3, wherein the retraction means for selectively releasably attaching the at least one crossbar member further comprises:

means for biasing the at least one retractable engagement member into an outwardly extended position, relative to the at least one crossbar member, such that when the at least one retractable engagement member is in the outwardly extended position, the at least one retractable engagement member may be insertingly received within the inwardly opening slot.

5. The apparatus for supporting a cover for an open-topped vehicle enclosure according to claim 4, wherein the one end of the at least one elongated crossbar member is substantially hollow and the at least one retractable engagement member is insertingly, reciprocably received within the substantially hollow one end of the at least one elongated crossbar member, and the means for biasing the at least one retractable engagement member into an outwardly extended position further comprises:

a spring member, operably disposed in the substantially hollow end of the at least one elongated crossbar member, between the at least one retractable engagement member and a recessed end wall of the at least one elongated crossbar member.

6. The apparatus for supporting a cover for an open-topped vehicle enclosure according to claim 3, further comprising:

means for enabling selective inward retraction of the at least one retractable engagement member.

7. The apparatus for supporting a cover for an open-topped vehicle enclosure according to claim 6, wherein the means for enabling selective inward retraction of the at least one retractable engagement member comprises:

a retraction member, operably affixed to, and emanating laterally from the at least one retractable engagement member, and extending through a slot in the substantially hollow end of the at least one elongated crossbar member, such that by exertion of force by a user on the retraction member, the at least one retractable engagement member may be forced to move, against the force of the biasing means, toward a retracted position in the substantially hollow end of the at least one elongated crossbar member.

8. The apparatus for supporting a cover for an open-topped vehicle enclosure according to claim 3, wherein the at least one retractable member is fabricated from a non-metallic, non-scratching material.

9. The apparatus for supporting a cover for an open-topped vehicle enclosure according to claim 8, wherein the at least one retractable member is fabricated from a resilient plastic material.

10. The apparatus for supporting a cover for an open-topped vehicle enclosure according to claim 3, wherein the means for selectively releasably attaching the at least one elongated crossbar member comprises:

two retractable engagement members, operably disposed at opposite ends of the at least one elongated crossbar member, for reciprocable movement relative to the crossbar member, and operably configured to be insertingly received within the inwardly opening slot in each of the rail members.

* * * * *